United States Patent

Iba et al.

[11] Patent Number: 6,153,032
[45] Date of Patent: Nov. 28, 2000

[54] HYDROGEN-ABSORBING ALLOY AND PROCESS FOR PREPARING THE SAME

[75] Inventors: Hideki Iba, Toyota; Etsuo Akiba, Tsuchiura, both of Japan

[73] Assignee: Toyota Jidosha Kabushiki Kaisha, Toyota, Japan

[21] Appl. No.: 09/269,880

[22] PCT Filed: Oct. 3, 1997

[86] PCT No.: PCT/JP97/03552

§ 371 Date: May 14, 1999

§ 102(e) Date: May 14, 1999

[87] PCT Pub. No.: WO98/14627

PCT Pub. Date: Apr. 9, 1998

[30] Foreign Application Priority Data

Oct. 3, 1996 [JP] Japan ................................. 8-281822

[51] Int. Cl.[7] .......................... C01B 6/24; C22C 14/00; C22C 27/02; C22C 27/06; C22C 1/18

[52] U.S. Cl. .......................... 148/669; 148/421; 420/421; 420/424; 420/428; 420/900

[58] Field of Search ........................ 420/421, 424, 420/428, 900; 148/538, 669, 421

[56] References Cited

U.S. PATENT DOCUMENTS 4,440,737  4/1984  Libowitz et al. .

FOREIGN PATENT DOCUMENTS 58-217654  12/1983  Japan .
61-250135  11/1986  Japan .
4-337045   11/1992  Japan .
7-252560   10/1995  Japan .

OTHER PUBLICATIONS

"Hydrogen absorption properties of Ti–Cr–A (A=V, Mo or other transition metal) B.C.C. solid solution alloys", T. Kabutomori et al., The Journal of Alloys and Compounds, vol. 231, No. 1, Dec. 15, 1995, pp. 528–532.

*Primary Examiner*—George Wyszomierski
*Assistant Examiner*—Janelle Morillo
*Attorney, Agent, or Firm*—Burns, Doane, Swecker & Mathis, LLP

[57] ABSTRACT

A hydrogen-absorbing alloy capable of controlling the very fine structure formed by a spinodal decomposition for improving flatness of an emission equilibrium pressure in a practical temperature/pressure range and excellent in activation and hydrogen absorption/desorption amounts, and a production method thereof. The hydrogen-absorbing alloy has a composition expressed by the general formula $Ti_x Cr_y V_z$ (where each of x, y and z represents an atomic percent and satisfies the relation x+y+z=100), wherein the composition has a body-centered cubic structural phase as a principal phase, the principal phase exists within the range in which the body-centered cubic structure appears and a spinodal decomposition occurs with the exception of a C14 (a typical structure of the Laves phase; a $MgZn_2$ type crystal structure) mono-phase range, and has a regular periodical structure formed by the spinodal decomposition, and its apparent lattice constant is at least 0.2950 nm but is not greater than 0.3060 nm. The production method of the hydrogen-absorbing alloy comprises conducting a solution heat-treatment at 700 to 1,500° C. for one minute to 100 hours, and a cooling treatment and/or an aging treatment at 350 to 1,200° C. for one minute to 200 hours.

4 Claims, 5 Drawing Sheets

HYDROGEN-ABSORBING ALLOY AND PROCESS FOR PREPARING THE SAME

TECHNICAL FIELD

The present invention relates to a hydrogen-absorbing alloy. More particularly, the present invention relates to a hydrogen absorbing alloy which makes it possible to control a very fine structure formed by a spinodal decomposition so as to improve the flatness of an equilibrium pressure (flatness of a plateau portion), and which is excellent in activation performance and absorption and desorption amounts, and a method of producing such a hydrogen-absorbing alloy.

BACKGROUND ART

Solar energy, atomic power, wind power, geothermal heat, re-utilization of waste heat, etc, have been proposed as new energy sources to replace fossil fuel from the aspect of the environmental problems of the earth. For all of these sources, a common problem is how to store and transport energy. A system which electrolyzes water by using solar energy or water power and uses the resulting hydrogen as an energy medium can be said to provide ultimate clean energy in the sense that the starting material is water and the product obtained by consuming this energy is also water.

As one of the means for storing and transporting this hydrogen, a hydrogen-absorbing alloy can absorb and store a hydrogen gas to a capacity about 1,000 times the volume of the alloy itself, and its volume density is substantially equal to, or greater than, that of liquid or solid hydrogen. It has long been known that metals and alloys having a body-centered cubic lattice structure (hereinafter called the "BCC structure"), such as V, Nb, Ta, Ti—V alloys, etc, absorb and store greater amounts of hydrogen than an $AB_5$ type alloys such as $LaNi_5$ and $AB_2$ type alloys such as $TiMn_2$ that have been already put into practical application. This is because the number of hydrogen absorbing sites in the crystal lattice is large in the BCC structure, and the hydrogen absorbing capacity according to calculation is as great as H/M=2.0 (about 4.0 wt % in alloys of Ti or V having an atomic weight of about 50).

A pure vanadium alloy absorbs and stores about 4.0 wt %, which is substantially similar to the value calculated from the crystal structure, and desorbs about half this amount at normal pressure and room temperature. It is known that Nb and Ta as the elements of the same Group 5A of the Periodic Table exhibit a large hydrogen storage capacity and excellent hydrogen desorption characteristics in the same way as vanadium.

Because pure V, Nb, Ta, etc, are extremely high in cost, however, the use of these elements is not realistic in industrial application which requires a considerable amount of the alloys, such as a hydrogen tank or a Ni—MH cell. Therefore, properties of alloys have been examined within the range having the BCC structure such as Ti—V, but new problems have arisen in that these BCC alloys merely absorb and store hydrogen at a practical temperature and pressure but that their hydrogen desoprtion amount is small, in addition to the problems encountered in V, Nb and Ta in that the reaction rate is low and activation is difficult. As a result, alloys having a BCC phase as the principal constituent phase have not yet been put into practical application.

The conventional attempt to control the characteristics by alloying has been carried out by component design in all of the $AB_5$ type, the $AB_2$ type and the BCC type. However, the set range of the components does not exceed the category of the inter-metallic compound single-phase and the BCC solid solution single-phase in all of these examples. As one of the known references in this field, Japanese Unexamined Patent Publication (Kokai) No. 7-252560 discloses an alloy which has a composition of five or more elements, has a body-centered cubic structure as a crystal structure, comprises a Ti—Cr system as the basic system and is expressed by the general formula $Ti_{100-x-y-z}Cr_xA_yB_z$, where A is at least one member selected from the group consisting of V, Nb, Mo, Ta and W, and B is at least one member selected from the group consisting of Zr, Mn, Fe, Co, Ni and Cu. As the effects of the alloy, this reference describes that a sufficient hydrogen absorption effect cannot be expected by optimization of the lattice constant alone, and when the size of virtual spheres that can be arranged in spacing is at least 0.33 Å in terms of their radius, the hydrogen absorption amount increases drastically. However, this reference does not have the concept of utilizing the region in which the spinodal decomposition occurs, but only stipulates the lattice constant.

The quaternary alloy system having the BCC structure according to the prior art described above are arranged by handling the solid solution as a single phase, though the metallic structure is a multi-phase. In other words, all of the prior art references do not pay specific attention to the metallic structure of the alloys having two or more phases, do not either mention to control the metallic structure, and do not at all describe the phases other than the single phase. As to the effect, too, the prior art references mitigate the reaction rate and the activation condition to a certain extent but do not succeed in improving the desorption characteristics themselves, that is, the mitigation of the absorption and desorption temperature and the pressure condition. In this way, creating the technology of achieving the multi-phase structure by understanding the influences of the multi-phase and controlling this multi-phase structure so as to drastically increase the capacity and to mitigate the absorption and desorption characteristics has not yet been accomplished. Therefore, the technical development of a hydrogen-absorbing alloy capable of further improving these characteristics by the multi-phase control technology has therefore been desired.

SUMMARY OF THE INVENTION

It is an object of the present invention to provide an epochal high-capacity alloy, capable of being used effectively as an energy carrier, by optimizing chemical components of a Ti—Cr—V alloy system and its heat-treatment from the following aspects in order to improve flatness of an equilibrium pressure of a hydrogen-absorbing alloy in a practical temperature and pressure range.

(1) To obtain a hydrogen absorption quantity greater than that of the linear combination of the constituent phases by optimizing the relationship between the internal strain of the alloy and the construction that exerts great influences on flatness (flatness of a plateau portion); and (2) To clarify the control factors of the wavelength of the modulated structure and its amplitude in the multiple phases and to make it possible to control optimization of the structure in the practical process.

It is another object of the present invention to provide an alloy having highly functional constituent phases by examining the chemical components that are most suitable for the improvement of the structure described above on the premise of the range in which the spinodal decomposition in the BCC phase can take place.

It is still another object of the present invention to provide an alloy which is based on an evaluation method which utilizes a novel structure analysis software in order to evaluate optimization of the structure under the two-phase separation state.

The gist of the present invention for accomplishing the objects described above resides in the following points.

(1) A hydrogen-absorbing alloy having a composition expressed by the general formula $Ti_xCr_yV_z$ (where each of x, y and z represents an atomic percent and satisfies the equation x+y+z=100), wherein the composition has a body-centered cubic structural phase as a principal phase, the principal phase exists within the range in which the body-centered cubic structure appears and a spinodal decomposition occurs with the exception of a C14 (a typical structure of the Laves phase; a $MgZn_2$ type crystal structure) mono-phase range, and has a regular periodical structure formed by the spinodal decomposition, and its apparent lattice constant is at least 0.2950 nm but is not greater than 0.3060 nm.

(2) A hydrogen-absorbing alloy wherein the composition described in the item (1) exists within the range encompassed by segments formed by points A, B, C, D, E, F and G in a Ti—Cr—V ternary phase diagram shown in FIG. 1 (inclusive of the range on the segments).

(3) A method for producing a hydrogen-absorbing alloy which comprises a step of melting and casting the Ti—Cr—V ternary alloy according to the item (1) or (2) described above and applying a solution heat-treatment to the cast ingot at 700 to 1,500° C. for one minute to 100 hours, a step of cooling the ingot and a step of applying an aging treatment at 350 to 1,200 C. for one minute to 200 hour.

(4) A method for producing a hydrogen-absorbing alloy which comprises a step of melting and casting the Ti—Cr—V alloy according to the item (1) or (2) described above and applying a solution heat-treatment to the cast ingot at 700 to 1,500 C. for one minute to 100 hours, and a step of applying an aging treatment to the ingot at 350 to 1,200° C. for one minute to 200 hours.

BRIEF DESCRIPTION OF DRAWINGS

FIGS. 1(a) and 1(b) show the composition range of a Ti—Cr—V alloy system according to the present invention, wherein FIG. 1(a) shows the range in a ternary system phase diagram and FIG. 1(b) shows an alloy composition at each point.

FIGS. 2(a) and 2(b) show hydrogen absorption and desorption characteristics of the Ti—Cr—V alloy system according to the present invention at 40° C. depending on the existence and absence of heat-treatment, wherein FIG. 2(a) shows the hydrogen absorption and desorption characteristics and FIG. 2(b) is an explanatory view of flatness at a plateau portion.

FIGS. 4(a) and 4(b) show the relationship between a lattice constant mean value and the composition of the Ti—Cr—V alloy system according to the present invention, wherein FIG. 4(a) shows the relationship with Cr (at %) and FIG. 4(b) shows the relationship with Ti (at %).

FIGS. 7(a) and 7(b) show transmission electron micrographs representing the metallic structures of the Ti—Cr—V alloy system according to the present invention, wherein FIG. 7(a) shows a cast material and FIG. 7(b) shows a heat-treated material (at 1,200° C. for 2 hours, cooling with oil).

BEST MODE FOR CARRYING OUT THE INVENTION

The inventors of the present invention have acquired through a large number of experiments the knowledge that the hydrogen absorption and desorption characteristics can be remarkably improved among the BCC alloys particularly in those BCC alloys in which the phase is regularly decomposed into two very fine phases of a nano-order due to the spinodal decomposition. In the Ti, Cr and V systems, the two phases having the BCC structure as the crystal structure, that are formed due to the spinodal decomposition, grow in specific crystal orientations and have mutually different lattice constants, have a periodical structure with a spacing of 1.0 to 100 nm. The large hydrogen absorption amount which these BCC metals structurally have due to this regular nano-order periodical structure is emitted within a practical temperature and pressure range, the activation condition is mitigated and the reaction rate is improved. According to the first invention of the present invention based on this observation, the interface between the two phases of the BCC alloys that undergo the spinodal decomposition speeds up the migration of the hydrogen atoms and accomplishes the improvement of the reaction rate and eases of activation. Because stability of hydrides drops in the proximity of the interface due to the coherent strain between the two phases, this drop in stability presumably results in the improvement of the hydrogen desorption characteristics.

The growth of the modulated structure due to this spinodal decomposition can be divided into a spinodal decomposition period in which the concentration amplitude is increased from a concentration fluctuation of an initial stage and a wavelength increasing period in which the wavelength of the modulated structure formed in the former period is increased. In the Ti—Cr—V system and in the Ti—Mn—V system, the reaction in the spinodal decomposition period is so fast that this reaction is complete at the time of casting and solidification, or quenching after the heat-treatment, for example, and the modulated structure has already been formed. The hydrogen absorption amount and the desorption characteristics, particularly plateau flatness, can be controlled by controlling the increase of the concentration wavelength after completion of the decomposition.

Figures 1A, 1B:
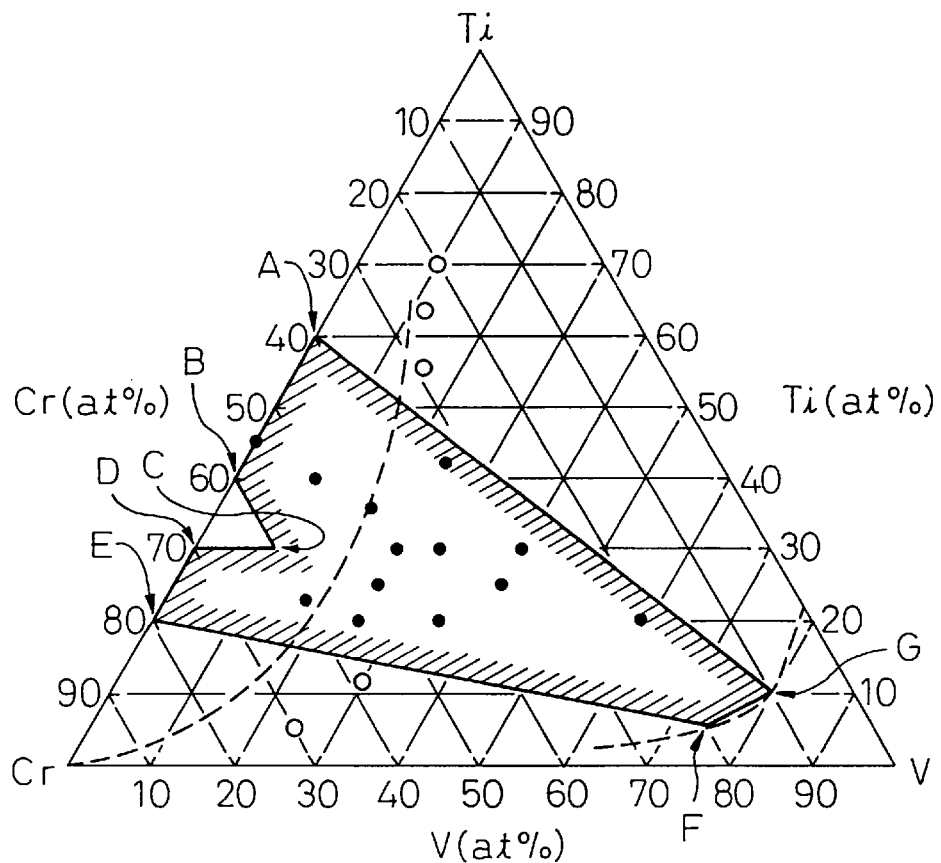

The second invention stipulates the scope of claim by referring to the Ti—Cr—V system phase diagram (FIG. 1(a)). The component value at each of the points A, B, C, D, E, F and G is shown in FIG. 1(b), and the scope of claim of the present invention lies in the region of oblique lines inclusive of the region on each segment of a line encompassed by these points. In this drawing, the segment of a line AG is a boundary line where the apparent lattice constant (mean lattice constant of two phases) is 0.3060 nm and the segment of a line EF is a boundary line where the apparent lattice constant (mean lattice constant of the two phases) is 0.2950 nm. Because both of the hydrogen absorption amount and the hydrogen desorption characteristics cannot be satisfied outside the range between both straight lines as will be described later, the present invention limits the range between both straight lines.

The factors that associate the very fine structure with the hydrogen absorption amount and the desoprtion characteristics are presumably as follows:

(1) the concentrations of the two phases formed by the increase of the concentration amplitude are different from the original alloy concentrations; and (2) the interface between the two phases is the coherent interface in the spinodal decomposition period and consequently, the lattice strain occurs in the interface to the extent corresponding to misfit of the lattice constants of the two phases.

The mechanism of the effects of these factors on the practical hydrogen absorption and desorption characteristics is assumed to be as follows.

Because the concentrations of the two phases are different as described above, the lattice constants deviate from each other by about 5/100 nm, and the change of the equilibrium pressure of hydrogen absorption and desorption resulting from this deviation becomes extremely great. In other words, a Ti-rich phase in which the lattice constants are great and hydrogen is absorbed and desorbed at a low equilibrium pressure and a V-rich phase in which the lattice constants are small and hydrogen is absorbed and desorbed at a high equilibrium pressure mix with each other. In such a mixture of the two phases, two stages of plateaus are normally formed at each equilibrium pressure. In the alloy according to the present invention, however, a flat plateau portion is formed within the range of the pressure that can be used at a normal pressure. This is because the mutual interfaces are continuous due to coherency and since these two phases mix with each other in the nano-order, the hydrogen absorption and desorption characteristics presumably become continuous, too.

The region BCD in the drawing is a C14 (TiCr$_2$) mono-phase region, and the present invention excludes this range. Though several reports have been made in the past to the effect that some C14 phase type alloys according to the prior art contain the BCC phase, hydrogen absorption and desorption of these alloys is achieved by the function of the Laves phase portion as the principal phase, and the BCC phase portion exhibits only the function of improving durability by preventing the alloys from becoming fine powder. Further, the region FG represents the limit at which the spinodal decomposition occurs, and the spinodal decomposition does not occur outside this range. In the drawing, the phase is the C14 phase+BCC phase in the proximity of the BCD region described above, and is the BCC mono-phase on the pure V side from this BCD region (on the V side from the dotted line on the left side among the two dotted lines in the drawing).

As long as the spinodal decomposition phase according to the present invention exists as the principal phase and the two phases having this regular periodical structure mainly exhibit the hydrogen storage function, a third phase having a different structure may exist as a mixture or those phases which exist in the colony form in a matrix of a different structure may be the spinodal decomposition phase.

Next, the reasons for limitation in the third and fourth inventions will be described in further detail.

In the binary Ti—Cr system that constitutes the ternary system according to the present invention, the alpha-phase of the hexagonal system is formed in the low temperature zone from its binary system phase diagram, but the spinodal decomposition range is relatively broad and the spinodal reaction takes place even when the production condition is not a specific condition where quenching is done from this decomposition zone. In the Ti—V system, however, the range is narrow and it becomes difficult to cause decomposition unless means such as quenching is employed.

On the other hand, because the Cr—V system forms the homogeneous solid solution, the alloy according to the present invention can be sufficiently designed on the basis of the binary system phase diagram in place of the ternary system phase diagram, that is, by referring to the Ti—Cr system and the Ti—V system. First, in order to cause the spinodal decomposition, the alloy elements are once melted to a solid solution in the cast material in the present invention, and are then heat-treated in the two-phase separation range in which the spinodal decomposition occurs. This is because the separation of the two phases can be confirmed in the very fine structure in the as-cast material but the periodical structure in a specific crystal orientation cannot be confirmed. To regularize such a structure, a thermal driving force for promoting the aggregation reaction becomes necessary, and more concretely, heat-treatment in the two-phase separation range is employed to achieve this object.

The operation of this heat-treatment can be explained as follows. The lattice strain occurring in the interface of the two phases changes the distribution state of the hydrogenation strain resulting from hydrogenation as described already. In the alloys having the BCC structure such as the alloys according to the present invention, in particular, the strain generated by hydrogenation exerts great influences on the pressure difference (hysteresis) of hydrogen absorption and desorption. Because such a strain at the initial stage can be controlled by heat-treatment in the alloys having the very fine structure according to the present invention, an optimum strain distribution having a small hysteresis can be generated.

In the present invention, the effect of the solution heat-treatment cannot be obtained so easily if the temperature is less than 700° C. and if the temperature exceeds 1,500° C., on the other hand, the effect of the solution heat-treatment tends to get into saturation. For this reason, the temperature is limited to 700 to 1,500° C. The effect of the solution heat-treatment is not sufficient if the treatment time is less than one minute and if the treatment time exceeds 100 hours, the effect of the solution heat-treatment tends to get into saturation and the treatment is sufficiently below this limit. Therefore, the treatment time is limited to one minute to 100 hours. This solution heat-treatment serves also as the homogenization treatment.

A cooling treatment and/or an aging treatment at 350 to 1,200° C. may be carried out individually or in combination as the post-treatment of this solution heat-treatment. Preferably, the cooling treatment is a quenching treatment. There can be the case where the alloy is kept at a temperature lower than the solution heat-treatment before the cooling treatment. When the aging treatment is not carried out, the solution heat-treatment has the same meaning as the homogenization treatment.

Because the spinodal decomposition starts from the solute concentration fluctuation inside the solid solution unlike the two-phase separation of the nucleation-growth type, the decomposition proceeds extremely uniformly and rapidly. The two phases formed by the spinodal decomposition is generally referred to as the "modulated structure", and can be controlled from several nm to dozens of nm by the production conditions such as the components and the heat-treatment. The two phases have a mutually coherent relationship, and the coherent strain occurs on the interface to the extent corresponding to the misfit of the lattice constants. The present invention utilizes this coherent strain as the factor contributing to instability of the hydrides.

Further, the periodical structure formed by the spinodal decomposition in the present invention means the following three states:

(1) the state of the concentration fluctuation during the formation of the structure due to the spinodal decomposition;

(2) the state where the spinodal decomposition is completed and the concentration amplitude becomes constant; and (3) the state where the wavelength increases due to the aggregation reaction.

As can be appreciated from the fact that the electron diffraction pattern of the transmission electron microscope obtained from the selected area including the two phases shows only the pattern of one kind of the BCC structure and the satellite appearing at each spot, the structure of the present invention is a periodical structure which is regularly arranged in the nano-scale in the specific crystal orientation and involves a predetermined amount of the lattice strain.

Hereinafter, the present invention will be explained in further detail with reference to Examples thereof shown in the accompanying drawings.

EXAMPLES

Example 1

This example was produced in order to examine the Ti—Cr—V alloy system compositions. Samples of the hydrogen-absorbing alloys were produced in the following way. The samples of this Example were all about 20 g ingots obtained by arc melting under an argon atmosphere by using a water-cooled copper hearth. Each of the as-cast ingots was pulverized in air and was subjected to the activation treatment comprising four cycles of evacuation at $10^{-4}$ Torr and hydrogen pressurization at 50 atm at a temperature of 500° C., and the hydrogen storage amount of each alloy and its hydrogen desorption characteristics were measured by the vacuum origin method stipulated by the pressure composition isothermal measurement method by a volumetric method (JIS H7201). Observation by the transmission electron microscope was made by preparing a thin film from each bulk sample by ion milling.

The structural analysis of each alloy was conducted by using a transmission electron microscope and its accessorial EDX (energy dispersive X-ray spectrometer). Further, each crystal structural model was produced on the basis of the information obtained by the transmission electron microscope, and Rietveld analysis of powder X-ray diffraction data was conducted.

Unlike ordinary X-ray diffraction methods, the Rietveld analysis can refine the crystal structure parameters more precisely by using the diffraction intensity and can provide the weight fraction of each phase by calculation.

The analysis software "RIETAN-94", developed by Dr. Izumi of National Institute for Research in Inorganic Materials, was used for the Riedveld analysis. Though the Riedveld analysis can provide an average phase fraction and crystal structural parameters with high precision, a crystal structure model having a very high probability is necessary for this analysis. The combination of these two means will presumably provide a powerful key for the development of materials by a novel structural control in the nano-scale so that the mutual demerits are remedied without limiting the hydrogen-absorbing alloy.

In this Example, the Ti—Cr—V alloy systems were produced by the production method described above and were measured by the method as also described above. Table 1 altogether tabulates the alloy compositions and the measurement result of the lattice constant of each alloy and its hydrogen absorption and desorption amounts.

TABLE 1

| alloy | lattice constant (nm) | hydrogen absorption/desorption amount (H/M) |
|---|---|---|
| $Ti_5Cr_{70}V_{25}$ | 0.2930 | 0.01 |
| $Ti_{11}Cr_{59}V_{30}$ | 0.2940 | 0.05 |
| $Ti_{26}Cr_{50}V_{24}$ | 0.3000 | 0.2 |
| $Ti_{30}Cr_{45}V_{25}$ | 0.3020 | 0.5 |
| $Ti_{33}Cr_{42}V_{25}$ | 0.3033 | 1 |
| $Ti_{35}Cr_{45}V_{20}$ | 0.3040 | 1.2 |
| $Ti_{42}Cr_{33}V_{25}$ | 0.3048 | 1.3 |
| $Ti_{50}Cr_{29}V_{21}$ | 0.3052 | 1.2 |
| $Ti_{55}Cr_{29}V_{14}$ | 0.3060 | 0.5 |
| $Ti_{64}Cr_{24}V_{12}$ | 0.3080 | 0.3 |
| $Ti_{70}Cr_{20}V_{10}$ | 0.3110 | 0.2 |

Figure 3:
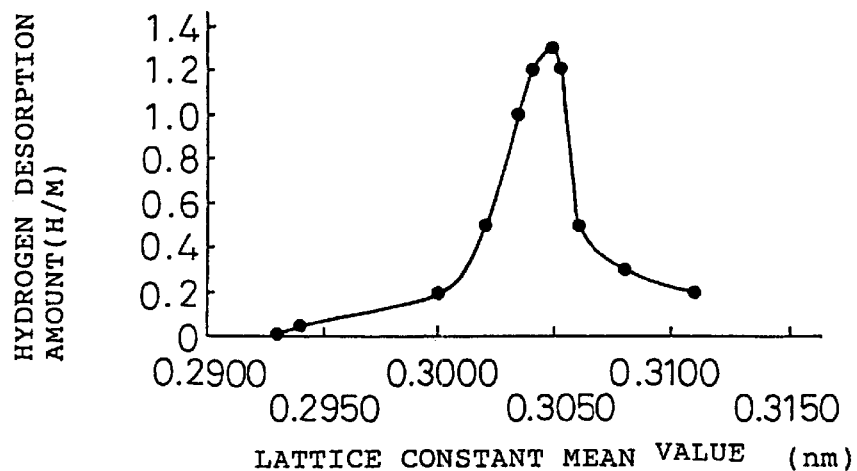
FIG. 3 shows the relationship between a lattice constant mean value of the Ti—Cr—V alloy system according to the present invention and a hydrogen absorption and desorption amount.

FIG. 3 shows the relationship between the hydrogen absorption/desorption amounts of the Ti—Cr—V alloys and the lattice constants. In this drawing, the mean value of the lattice constants on the abscissa represent the apparent lattice constants of the two phases formed by the spinodal decomposition, and is obtained by averaging the lattice constants of the two phases but is not the lattice constant of the single phase. When the lattice constant mean value is less than 0.2950 nm, the hydrogen absorption/desorption amounts are low and as the lattice constant mean value increases, the hydrogen absorption/desorption amounts become greater, assumes the maximum value of 1.4 H/M in the proximity of 0.3040 nm, and thereafter drops drastically as the lattice constant mean value increases. It can be appreciated from this diagram that in order to obtain the hydrogen absorption/desorption amounts exceeding the predetermined amounts, the mean value of the lattice constants of the two phases in the nano-order that constitute the BCC phase most suitably falls within the range of 0.2950 nm to 0.3060 nm.

Figure 4A:
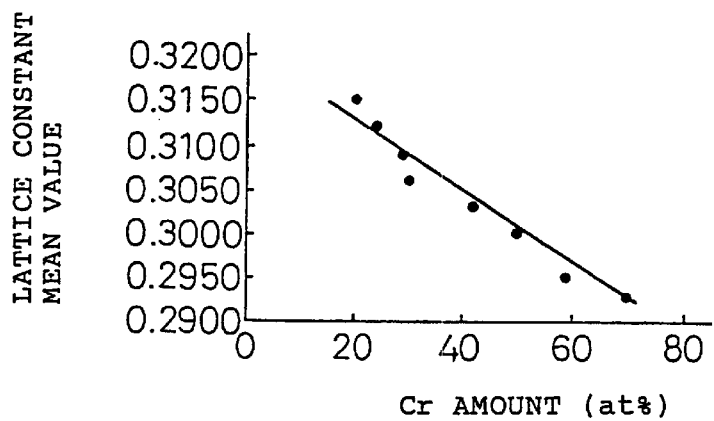
Figure 4B:
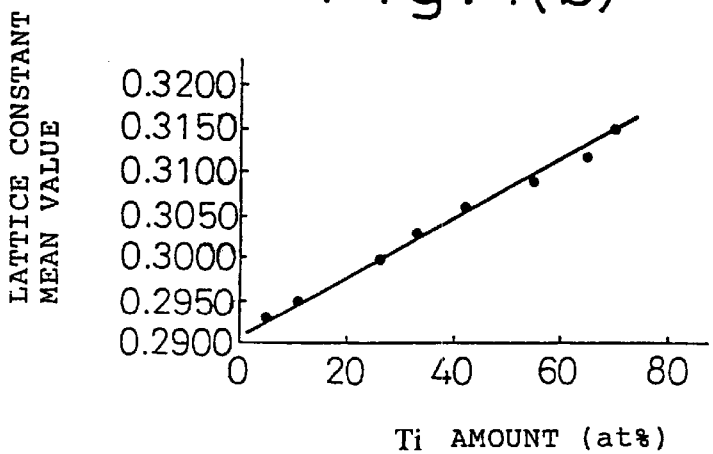

Further, the lattice constants were measured by variously changing the Cr and Ti amounts so as to obtain the relationship between the lattice constants and the components. The results are shown in FIGS. 4(a) and 4(b) in terms of the relationship between the components and the lattice constants. It can be appreciated from FIG. 4(a) that when the Cr amount increases, the lattice constant tends to decrease. On the other hand, it can be appreciated from FIG. 4(b) that when the Ti amount increases, the lattice constant tends to increase. It can be concluded from these diagrams that the composition range of Ti, Cr and V that gives the lattice constant within the range of 0.2950 nm to 0.3060 nm described above is found as follows from the results shown in FIGS. 4(a) and 4(b):

5<Ti (at %)<60, 10<Cr (at %)<80, 10<V (at %)<80

In this instance, the range in which at least 90%, in terms of the weight fraction, of the phase of another C14 type crystal structure different from the BCC type is formed in the alloy, is excluded.

Example 2

This Example was directed to examine methods of controlling the characteristics of the Ti—Cr—V type alloy systems by the heat-treatment. The production method and the control method of the alloys in this Example were the same as those of Example 1. The alloy composition of this Example was $Ti_{25}Cr_{35}V_{40}$. In this Example, the TiCrV alloy was heat-treated and the characteristics of the two phases of the nano-order formed by the spinodal decomposition were controlled.

Figure 5:
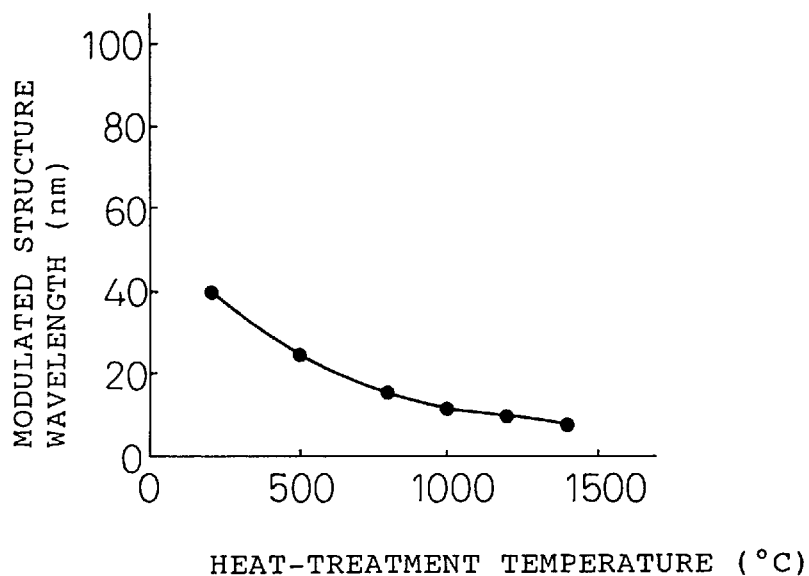
FIG. 5 shows the relationship between a heat-treatment temperature and a modulated structure wavelength of the Ti—Cr—V alloy system according to the present invention.

The wavelength of the modulated structure after the heat-treatment for forming the spinodal decomposition phase changes with the heat-treatment temperature. FIG. 5 shows the relationship between the wavelength of the modulated structure and the heat-treatment temperature. It can be appreciated from this diagram that when the heat-treatment temperature rises, the wavelength of the modulated structure decreases and the growth of the resulting phase becomes slow and gradual. It can be seen also from this diagram that a preferred heat-treatment temperature exists within the range of 700 to 1,500° C.

Figure 2A:
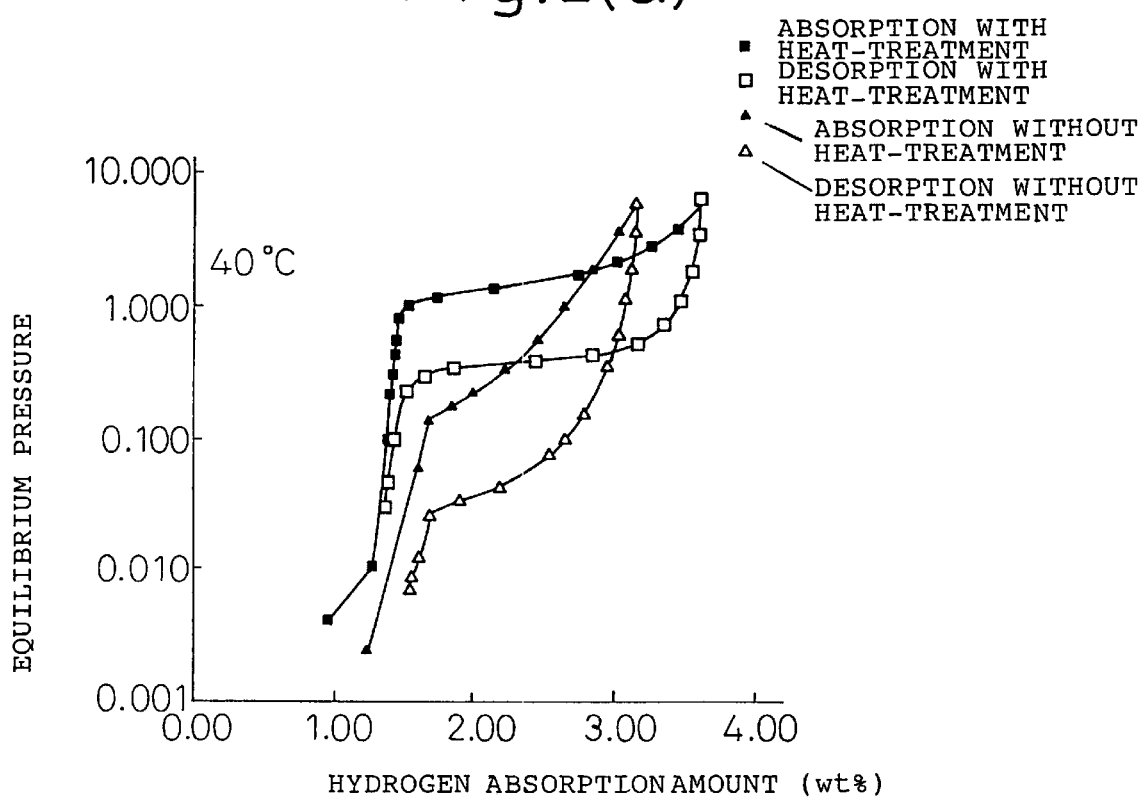
Figure 2B:
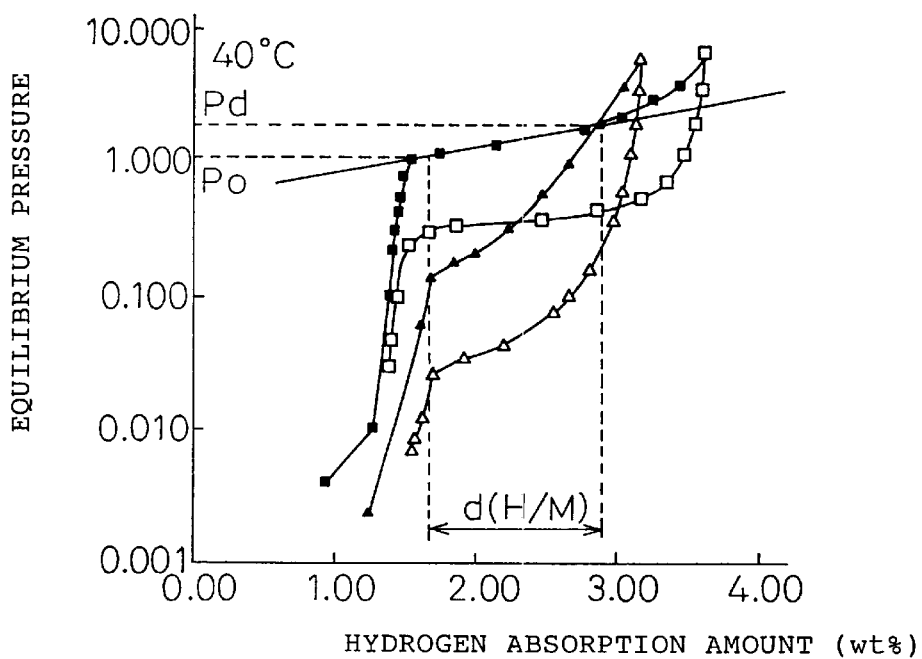

FIG. 2(a) shows the pressure-composition isothermal line of the alloys to which a typical heat-treatment was applied. According to this diagram, the hydrogen absorption amount at 40° C. when heat-treatment was conducted was about 3.7 wt % and when heat-treatment was not conducted, the hydrogen absorption amount was about 3.1 wt %. Next, FIG. 2(b) shows an explanatory view of flatness of the plateau portion on the basis of FIG. 2(a). In this drawing, the flatness factor Sf of the plateau portion was evaluated by Sf=d(lnPd/Po)/d(H/M), and flatness could be remarkably improved when heat-treatment with a small Sf was conducted.

Figure 6:
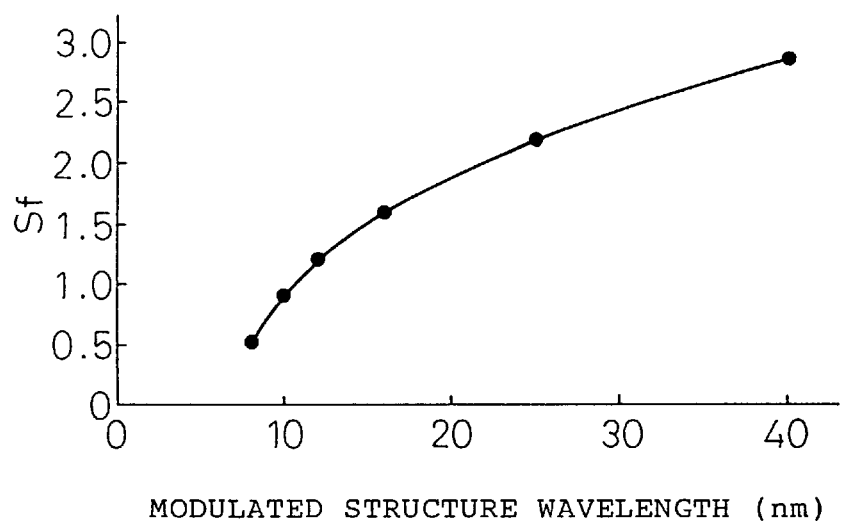
FIG. 6 shows the relationship between the modulated structure wavelength and a flatness factor Sf of the plateau portion of the Ti—Cr—V alloy system according to the present invention.

FIG. 6 shows the relationship between flatness of the plateau portion and the wavelength of the modulated structure of the nano-order structure. It can be appreciated that when the heat-treatment temperature was raised, the wavelength of the modulated structure decreased, so that Sf became small, the plateau portion became flattened, and this heat-treatment improved flatness of the plateau portion of the pressure-composition isothermal line. As a result, the maximum absorption and desorption amounts were increased.

From the explanation given above, the factors for controlling the wavelength of the modulated structure are presumably the cooling rate at the time of casting-solidification, the temperature and time of the heat-treatment, the quenching condition, the temperature and time of the aging heat-treatment, and so forth. To obtain optimal flatness of the plateau portion, it is necessary to control the wavelength of the second phase, which is given as the result of this heat-treatment, to preferably not greater than 100 nm.

Example 3

This Example was carried out to examine methods of controlling the very fine structure of the nano-order that was formed by the spinodal decomposition brought forth by the heat-treatment of the Ti—Cr—V type alloys. The production method of the alloy and its measurement method in this Example were the same as those of Example 1. This Example controlled the characteristics of the two phases of the nano-order formed by the spinodal decomposition by comparing the existence/absence of the heat-treatment of the TiCrV alloys.

Figure 7A:
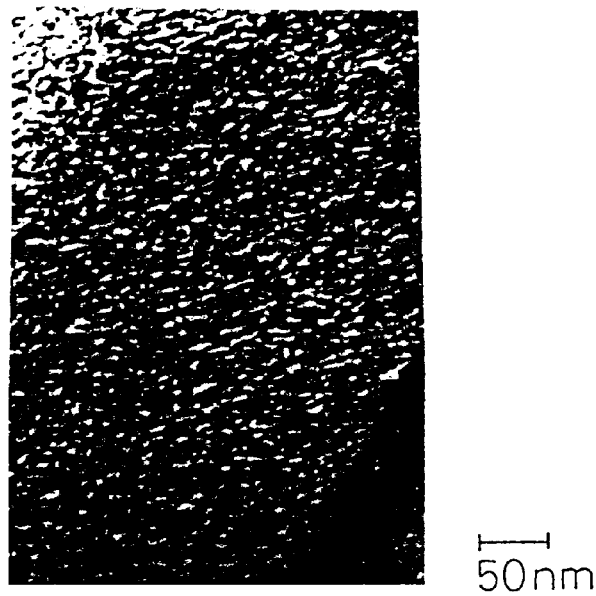
Figure 7B:
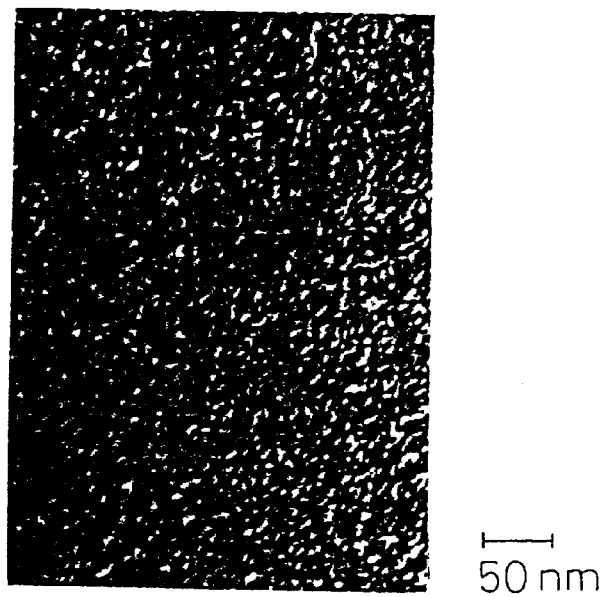

FIG. 7 shows the transmission electron micrograms of the very fine structures of the nano-order that were observed in the as-cast material melted in a small arc furnace and in the sample which was heat-treated at 1,200° C. for 2 hours. In other words, FIG. 7(a) show the very fine structure of the as-cast sample which was not heat-treated and FIG. 7(b) shows the very fine structure of the sample which was cooled (quenched) with an oil at 1,200° C. for 2 hours.

In FIG. 7(a), melting in the small arc furnace has a relatively higher cooling rate than ordinary arc melting but in this cast-solidification process, too, the spinodal decomposition occurred and a modulated structure having a relatively large wavelength was formed. It can be appreciated that after this alloy was subjected to the solution heat-treatment at 1,200° C., cooling with the oil was conducted. Consequently, this structure became finer and dependence of the modulated structure on the orientation became smaller.

INDUSTRIAL APPLICABILITY

The present invention addresses the problems of the BCC alloys that the reaction rate is low, activation is difficult and hydrogen absorption and desorption characteristics under the practical condition are inferior. The interface defined by the two phases formed in the nano-order speeds up the migration of the hydrogen atoms inside the metal as a high speed diffusion path and eventually results in the improvement in the reaction rate and easiness of activation. It is believed that stability of the hydrides drops in the proximity of the interface due to the coherent strain between the two phases, and this drop results in the improvement of the hydrogen absorption and desorption characteristics. The present invention has succeeded in remarkably improving the hydrogen desorption characteristics of the BCC alloys due to these synergistic effects. When the two phases are dispersed in the nano-order and the interface of the two phases is oriented in a specific crystal orientation due to coherency, the densities of the interface and the influence region of the coherent strain presumably improve the characteristics to a marked extent.

Because the two phases are dispersed uniformly in the present invention, the strain is not localized, and because the interface is the coherent interface, it does not easily serve as the start points of cracks. As a result, the alloy does not easily turn into fine dust and this fact presumably remarkably improves the durability.

What is claimed is:

1. A hydrogen-absorbing alloy having a composition expressed by the general formula $Ti_xCr_yV_z$, where each of x, y and z represents an atomic percent and satisfies the relation x+y+z=100, wherein the composition has a body-centered cubic structural phase as a principal phase, said principal phase exists within the range in which said body-centered cubic structure appears and a spinodal decomposition occurs with the exception of a C14 Laves phase, and the spinodal decomposition forms a periodic structure having a spacing of 1.0 mm to 100 nm, and its apparent lattice constant is at least 0.2950 nu but it is not greater than 0.3060 nm.

2. A hydrogen-absorbing alloy according to claim 1, wherein said composition exists within the range encompassed by segments defined by points A, B, C, D, E, F and G in a Ti—Cr—V ternary phase diagram shown in FIG. 1(a).

3. A method for producing a hydrogen-absorbing alloy having a composition expressed by the general formula $Ti_xCr_yV_z$, where each of x,y and z represents an atomic percent and satisfies the relation x+y+z=100, wherein the composition has a body-centered cubic structural phase as a principal phase, said principal phase exists within the range in which said body-centered cubic structure appears and a spinodal decomposition occurs with the exception of a C14 Laves phase, and the spinodal decomposition forms a periodic structure having a spacing of 1.0 mm to 100 nm, and its apparent lattice constant is at least 0.2950 nm but it is not greater than 0.3060 nm, comprising the following steps:

melting and casting said Ti—Cr—V ternary alloy into a cast ingot;

applying a solution heat-treatment to said cast ingot at 700 to 1,500° C. for one minute to 100 hours;

cooling said cast ingot; and aging said cast ingot at 350 to 1,200° C. for one minute to 200 hours.

4. A method for producing a hydrogen-absorbing alloy having a composition expressed by the general formula $Ti_xCr_yV_z$, where each of x,y and z represents an atomic percent and satisfies the relation x+y+z=100, wherein the composition has a body-centered cubic structural phase as a principal phase, said principal phase exists within the range in which said body-centered cubic structure appears and a spinodal decomposition occurs with the exception of a C14 Laves phase, and the spinodal decomposition forms a periodic structure having a spacing of 1.0 mm to 100 nm, and its apparent lattice constant is at least 0.2950 nm but it is not greater than 0.3060 nm, comprising the following steps:

melting and casting said Ti—Cr—V ternary alloy into a cast ingot;

applying a solution heat-treatment to said cast ingot at 700 to 1,500° C. for one minute to 100 hours; and applying an aging treatment to said cast ingot at 350 to 1.200° C. for one minute to 200 hours.

\* \* \* \* \*

UNITED STATES PATENT AND TRADEMARK OFFICE
CERTIFICATE OF CORRECTION

PATENT NO. : 6,153,032
DATED : November 28, 2000
INVENTOR(S) : Hideki Iba, et al.

It is certified that error appears in the above-identified patent and that said Letters Patent is hereby corrected as shown below:

Title page,
A second Assignee is added:

[73]  Assignee: Japan as represented by Director-General of Agency of Industrial Science and Technology.

Signed and Sealed this

Sixth Day of November, 2001

*Attest:*

NICHOLAS P. GODICI
*Attesting Officer*   Acting Director of the United States Patent and Trademark Office